April 29, 1958   L. A. MALEWICZ ET AL   2,832,478
AUTOMATIC TRANSFER DEVICE
Filed Oct. 5, 1954   3 Sheets-Sheet 1
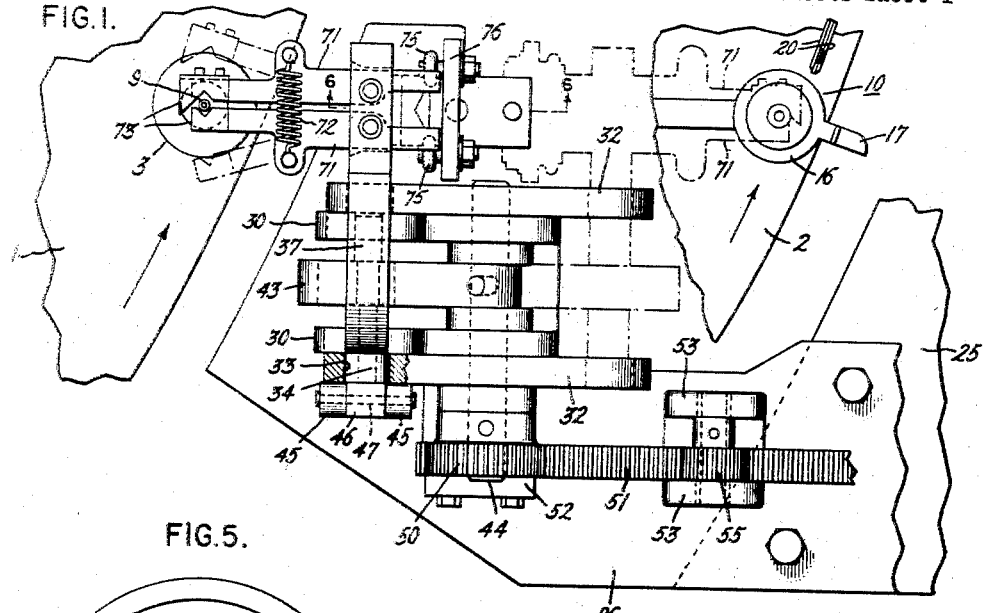
INVENTORS:
LEONARD A. MALEWICZ,
JESSE C. DANIELS,
BY
THEIR ATTORNEY.

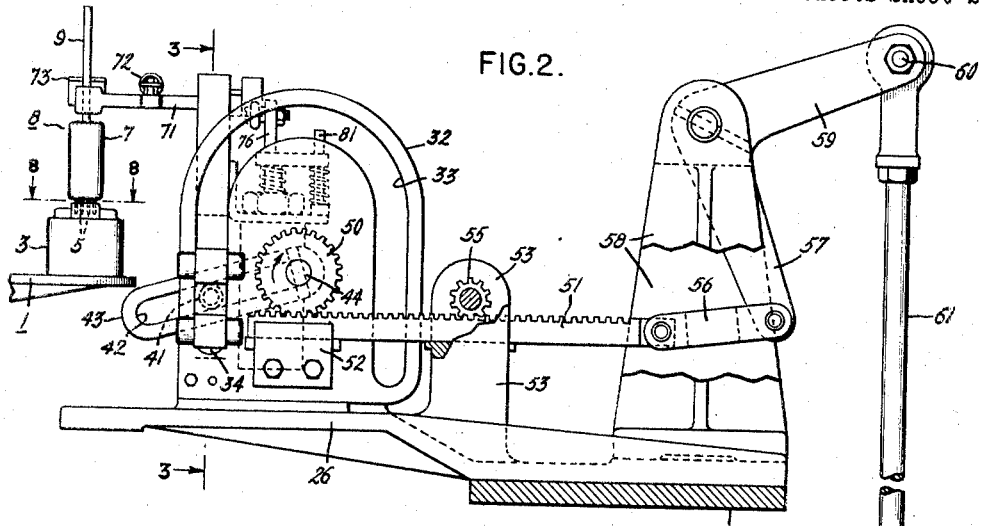
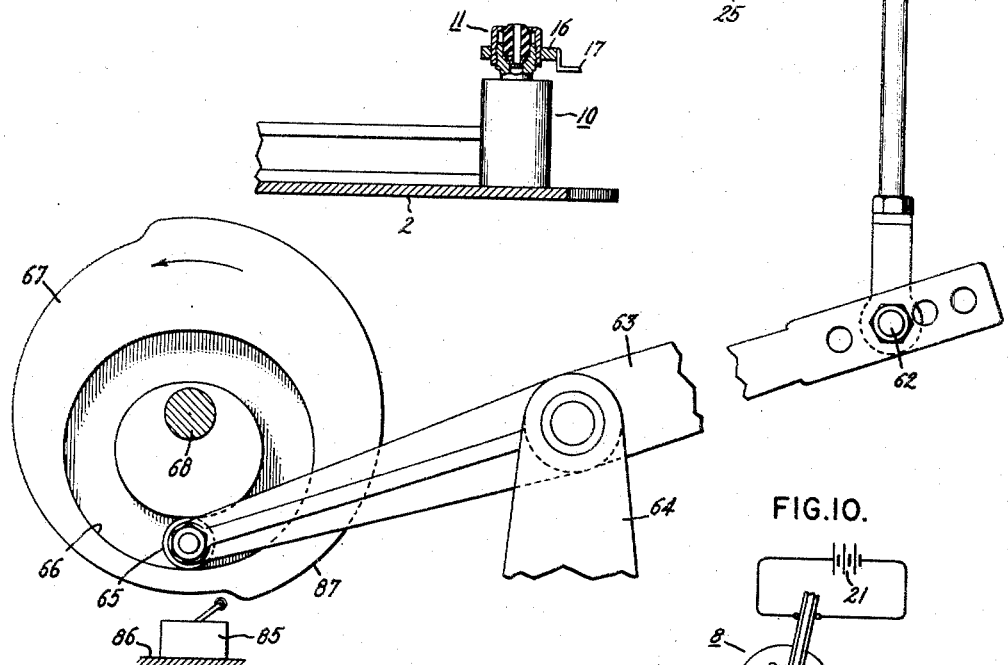
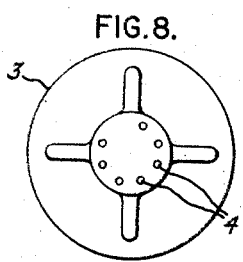
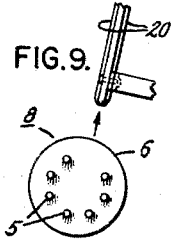
INVENTORS:
LEONARD A. MALEWICZ,
JESSE C. DANIELS,
BY Nathan Fowkerd
THEIR ATTORNEY.

April 29, 1958    L. A. MALEWICZ ET AL    2,832,478
AUTOMATIC TRANSFER DEVICE
Filed Oct. 5, 1954    3 Sheets-Sheet 3
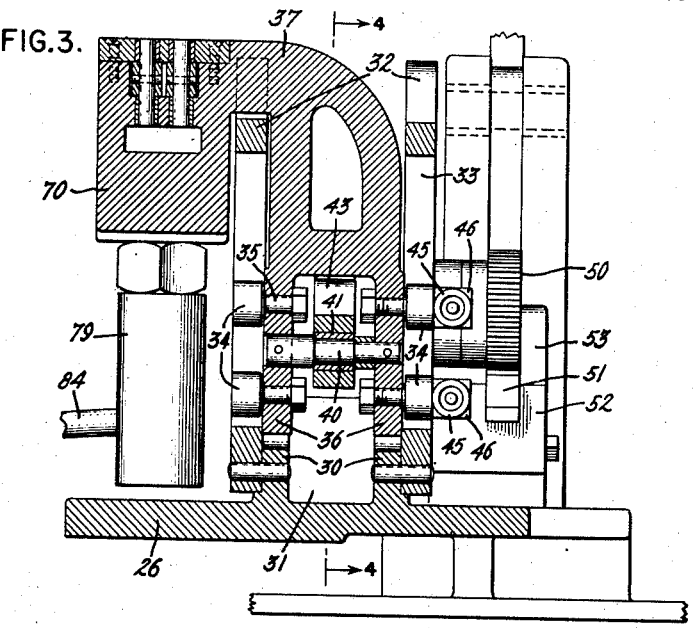
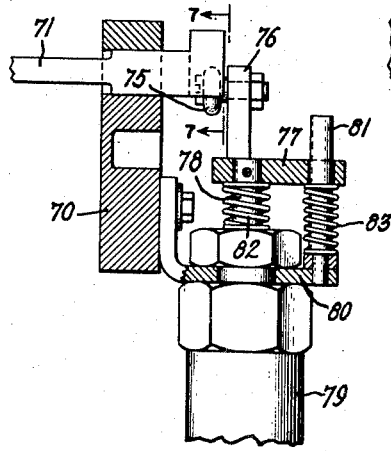
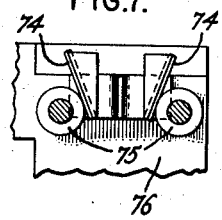
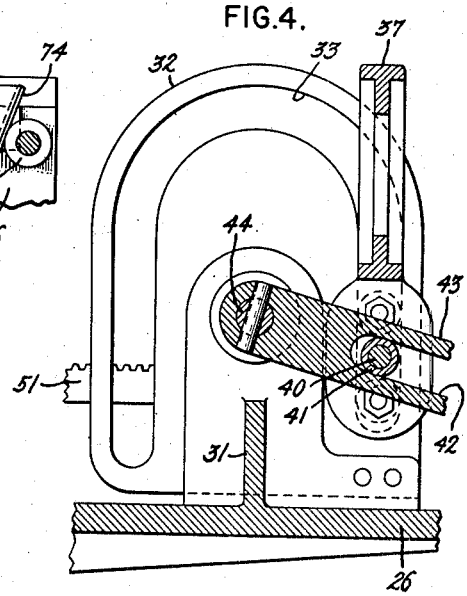
INVENTORS:
LEONARD A. MALEWICZ,
JESSE C. DANIELS,
BY
THEIR ATTORNEY

# United States Patent Office 2,832,478
Patented Apr. 29, 1958

2,832,478

AUTOMATIC TRANSFER DEVICE

Leonard A. Malewicz, Schenectady, N. Y., and Jesse C. Daniels, Owensboro, Ky., assignors to General Electric Company, a corporation of New York Application October 5, 1954, Serial No. 460,496

9 Claims. (Cl. 214—1)

Our invention relates to electronic tube manufacturing equipment and pertains more particularly to a new and improved automatic device for transferring tubes from one operating station to another in electronic tube manufacturing equipment.

Some tube manufacturing equipment is constructed to provide an inner rotatable turret carrying a plurality of spaced sockets for receiving and holding tube stems while tube bottles including exhaust tubulations are fused thereto. Such equipment additionally often includes a concentrically arranged outer rotatable turret carrying a plurality of exhaust heads each adapted for receiving the exhaust tubulation of a tube previously formed by the fusion of the stem and bottle portions on the first or inner turret. The exhaust heads are adapted for holding the tubes and carrying them to various operating stations around the machine as the turret is intermittently angularly displaced or indexed. Heretofore, transfer of tubes from the inner turret, on which the tube bottles are fused to the tube stems, to the exhaust heads carried by the outer turret has been carried out manually. That is, a machine operator was required both to load the stems and bottle portions on the inner turret and to transfer the completed tube envelopes from the inner turrets to the exhaust heads on the outer turret. Additionally, in transferring the tubes to the exhaust heads it was necessary for the operator to insert the tubes in the heads in a predetermined oriented manner in order thereby to insure satisfactory cooperation of certain of the tube leads or prongs with certain other devices comprising part of the machine, such as a contact arrangement provided for energizing the tube filament during processing of the tube. Now, the production capacity of most tube manufacturing equipment exceeds the ability of an operator to remove and transfer the tubes from the sockets on the inner turret to the exhaust heads and to orient properly the tubes in the exhaust heads. Accordingly, it is desirable and a primary object of our invention to provide automatic means for transferring the tubes and orienting them in the exhaust heads.

Another object of our invention is to provide a new and improved automatic tube transfer device adapted for minimizing the manual operations required of a machine operator.

Another object of our invention is to provide a new and improved tube transfer device adapted for increasing the rate of production of automatic tube manufacturing equipment.

Further objects and advantages of our invention will become apparent as the following description proceeds, and the features of novelty which characterize our invention will be pointed out with particularity in the claims annexed to and forming part of this specification.

In carrying out the objects of our invention we provide tube manufacturing equipment including a rotatable inner turret carrying tube sockets for holding tube stems while the bottle portions of tubes are fused thereto, and a rotatable outer turret including exhaust heads adapted for receiving the exhaust tubulations of completed tube envelopes and carrying the tubes to various operating stations. Provided for transferring the tubes from a socket on the inner turret to an exhaust head is automatic cyclically operative means adapted for gripping a tube in a socket on the inner turret and transferring and inverting it for insertion of the tubulation thereof into the compression head of an exhaust head. The tube sockets on the inner turret are predeterminedly oriented which provides for a predetermined orientation of the leads of the tube when the tubulation thereof is inserted in the exhaust head, thereby to insure satisfactory cooperation between certain of the tube leads and other operating components of the equipment.

For a better understanding of our invention reference may be had to the accompanying drawing in which:

Fig. 1 is a fragmentary plan view illustrating the transfer device;

Fig. 2 is a fragmentary side elevation view of the device;

Fig. 3 is an enlarged fragmentary section taken along the line 3—3 in Fig. 2;

Fig. 4 is a fragmentary section taken along the line 4—4 in Fig. 3;

Fig. 5 is a fragmentary side elevation view illustrating the manner in which the device is effective for inserting a tube in an exhaust head;

Fig. 6 is an enlarged sectional detail view taken along the line 6—6 in Fig. 1;

Fig. 7 is an enlarged fragmentary sectional view taken along the line 7—7 in Fig. 6;

Fig. 8 is an enlarged view looking in the direction of the arrows on line 8—8 in Fig. 2;

Fig. 9 is an enlarged view looking in the direction of the arrows on line 9—9 in Fig. 5; and Fig. 10 is an enlarged view illustrating the manner of cooperation of the tube filament leads and the contact members.

Referring to Fig. 1 there is shown fragmentarily an inner turret 1 and an outer turret 2. The turrets 1 and 2 are arranged concentrically and are adapted by suitable means (not shown) for intermittent angular displacement or rotation on a common vertical shaft (also not shown). Additionally, the inner turret 1 is disposed in a horizontal plane spaced above the outer turret 2 in the manner shown in Fig. 2.

The inner turret 1 carries on its upper surface adjacent the periphery thereof a plurality of spaced tube sockets 3 (only one of which is shown). As perhaps best seen in Fig. 8, each socket 3 is formed to include a plurality of substantially circularly arrayed receptacles 4 adapted for receiving the leads or prongs 5 of a tube stem generally designated 6 in Fig. 2. The tube stem 6 comprises a button portion of glass or any similar insulative material and the above-referred-to plurality of tube leads or prongs 5 which extend through the glass portion. A tube cage (not shown) is adapted for being mounted atop the tube leads and having the various components thereof including a heating element or filament suitably electrically connected to appropriate leads. The glass portion or button of the stem 6 is adapted for being bonded at its periphery to the edge of a bottle portion 7 thereby to provide a tube envelope 8. As best seen in Figs. 2 and 5, the tube envelope 8 includes an exhaust tubulation 9 through which the tube is adapted for being exhausted.

In the operation of presently employed equipment, an operator customarily inserts the prongs of tube stems in each of the stem sockets 3 as the turret 1 revolves past an appropriate loading station. The tube cage is already mounted on the stem and the operator additionally places the envelope bottle 7 over the cage and in contact with the stem 6. At a subsequent operating station heat is suitably supplied for fusing the edges of the bottle and the stem thereby to effect a satisfactory bond therebetween for completing the envelopes 8.

Subsequent to the completion of the tube envelope in the manner just described, the envelope arrives at the station shown in Figs. 1 and 2 which shall hereinafter be referred to as the transfer station since from this station the completed envelope is adapted for being transferred to an exhaust head 10 carried by the outer turret 2. The outer turret 2 is adapted for carrying a plurality of the exhaust heads 10 in spaced relation thereon. By the above-referred-to means not shown the turret 2 is adapted for being intermittently angularly displaced or indexed thereby to position each exhaust head 10 at a plurality of operating stations which includes the transfer station. Each exhaust head 10 includes an exhaust chamber (not shown) and a compression head generally designated 11 for holding the tubulation 9 of a tube envelope 8 in sealed communication with the exhaust chamber. The compression head 11 includes a bore vertically extending and externally threaded portion 12. The portion 12 includes a counterbore 13 for providing a seat for a centrally bored resilient cylindrical member 14. Threaded on the portion 12 is a cap 15 including a central aperture and adapted for cooperating with the resilient member 14. Securely fitted on the cap 15 is a collar 16 to which is suitably secured a cam arm 17. In the arrangement just described the member 14 is adapted for receiving the tubulation 9 of an envelope 8 when the cap 15 is in one rotative position in which it is ineffective for compressing the member 14. In another rotative position of the cap 15 the member 14 is compressed for gripping the tubulation 9 and thereby effecting a sealed communication between the envelope and the exhaust chamber of the exhaust head through the tubulation 9. It will be seen that operation of the compression head 11 by rotation of the cap 15 can be effected in various manners. For instance, solenoid or air cylinder operated means may be employed at an operation station in advance of the transfer station for engaging the member 17 thereby to rotate the cap 15 in one direction for opening the head in preparation for insertion thereinto of a tubulation 9. Additionally, following insertion of the tubulation in the compression head the member 17 may be oppositely actuated for compressing the member 14 and thereby closing the head by engagement thereof with a stationary portion of the machine as the turret rotates for advancing the exhaust head 10 from the transfer station shown. At the subsequent operating stations means (not shown) are effective for evacuating the exhaust head and thereby evacuating the envelope, testing the envelope for leaks, de-gassing the tube, tipping off the tube, etc. In some of the mentioned operations it is necessary to provide an electrical connection with certain of the leads 5 of each of the tubes. For instance, in certain of the operations it is necessary to energize the tube filaments. As seen in Figs. 1, 5, 9 and 10, this may be effected by causing the leads 5 connected with the tube filament to move into electrically conductive engagement with a suitably insulatively separated pair of contact members 20 disposed in at least a portion of the path of travel of the tube as it is moved around the machine. Specifically, as seen in Figs. 9 and 10, the contact members 20 are connected to a suitable power source 21 and are so disposed that as each tube carried by one of the heads 10 is moved out of the transfer station the two leads 5 connected to the tube filament move into engagement with respective ones of the contact members 20 whereby a circuit is completed through the filament for energizing same. It will be seen that the just-described arrangement requires that the tube be predeterminedly positioned in the head 10 in order to insure a predetermined orientation of the tube leads 5 for providing satisfactory cooperation between the filament leads and the contact members 20.

Heretofore, transfer of the tubes from the sockets on the inner turret to the exhaust heads on the outer turret and orientation of the tubes in the exhaust heads for insuring satisfactory cooperation between the filament leads and the contact members had been carried out manually. That is, an operator manually removed each tube from its socket on the inner turret and then inserted the tubulation 9 thereof in the compression head of an exhaust head on the outer turret and also manually oriented the tube in the exhaust head for providing cooperation between the filament leads and the contact members 20. This proved slow, tedious and was often unreliable. Additionally, it was difficult for an operator to keep up with the machine continuously over any appreciable length of time which prevented utilization of the equipment to its fully operating capacity. Accordingly, we have provided means adapted for automatically transferring the tubes from the inner turret to the outer turret, and for inserting the exhaust tubulations thereof in exhaust heads carried by the outer turret in a predetermined oriented manner adapted for insuring satisfactory cooperation between the filament leads of each tube and the contact means for effecting energization of the tube filaments during certain of the tube making operations. Our means is mounted on a stationary portion 25 of the machine frame. Suitably mounted on the frame portion 25 is a plate bracket 26 adapted for supporting our device and suitably disposing it at the transfer station between the turrets 1 and 2. As best seen in Figs. 3 and 4 the bracket 26 is formed to include a spaced pair of upwardly extending portions 30 connected by a web portion 31. As seen in Figs. 1–5, there is secured to the outer surfaces of each of the members 30 a vertical plate 32. These plates are identically constructed and are formed to include inverted U-shaped tracks or cam surfaces 33 adapted for receiving and cooperating with rollers 34. Two of the rollers 34 are mounted in each of the tracks 33 rotatably on studs 35 suitably secured in spaced relation in spaced arms 36 of a movable bracket generally designated 37. By this arrangement the rollers 34 are adapted for riding in the tracks for moving the bracket 37 from an upright vertical position shown in Figs. 2, 3 and 4 to an inverted vertical position shown in Fig. 5 and for returning it from the inverted position to the upright vertical position. As will be seen more clearly hereinafter, it is this arrangement which provides for the inversion of a tube as it is being transferred from the inner turret to the outer turret. It will be further seen more clearly hereinafter that the vertical portions of the tracks 33 afford the vertical movements of the bracket 37 required for removing a tube from a socket 3 without bending its leads 5 and for inserting the tubulation 9 in the compression head 11 without breaking the tubulation.

In order to effect the just-described movement of the bracket 37 there is provided between the arms 36 thereof a fixed shaft 40 upon which is suitably fitted and centrally disposed a suitable roller 41. The roller 41 is adapted for operating in an elongated slot 42 formed in an arm 43. The arm 43 extends between the portions 36 of the bracket 37 and at its inner extremity is suitably fastened on a shaft 44 adapted for being oscillated and which as seen in Figs. 1 and 4 is suitably journalled in the spaced brackets 30 and the plates 32.

In the arrangements described to this point, rotation of the shaft 44 clockwise in Fig. 2 will cause the slot 42 in the arm 43 to cooperate with the roller 41 mounted between the portions 36 of the bracket 37 and thereby causing the bracket 37 to move from the upright position thereof shown in Fig. 2 to the inverted position shown in Fig. 5. Additionally, counter rotation of the shaft or counterclockwise rotation in Fig. 5 will cause the bracket to be returned to the upright position of Fig. 2.

In order to facilitate the just-described movement of the bracket 37 we have provided additional rollers designated 45 for riding on the outer surface of the right-hand plate 32 in Fig. 3. The studs 35 on this side of the device extend beyond the outer surface of the plate 32 and the extremity of each of these studs is formed to include a block 46. Each block 46 carries a rod 47 extending perpendicular to its respecitve stud 35. Rotatably fitted on the extremities of the rods 47 are the rollers 45. As seen in Figs. 1–3 and 5, the rollers 45 are adapted for riding on the outer surface of the one plate 32 thereby to insure satisfactory cooperation between the rollers 34 and the tracks 33 and to prevent any skewing of the bracket 37 during the movement thereof.

In order to provide the required oscillation of the shaft 44 we have fitted a pinion 50 on an extension thereof. The pinion 50 is adapted for meshing with a horizontally extending rack bar 51. The rack bar 51 is adapted for being retained in cooperation with the pinion 50 by means of support member 52 secured to the adjacent plate 32 and formed to include a bearing surface upon which the rack bar slides. The rack bar is further supported between the arms 53 of an upright suport member formed off the plate 26. The rack bar is adapted for sliding movement on another bearing surface between the arms 53, and an idler pinion 55 suitably rotatably mounted between the arms 53 meshes with the rack bar. Thus, the rack bar 51 is adapted for suitably retained reciprocatory movement thereby to oscillate the shaft 44 through the pinion 50.

The rack bar 51 is pivotally connected at its extremtiy by a link 56 to one arm of a bellcrank 57 which in turn is rotatably mounted between a pair of arms 58 of a vertical support bracket formed off the plate 26. The outer arm 59 of the bellcrank is pivotally connected at 60 to the upper end of a connecting rod 61. The lower end of the rod is pivotally connected at 62 to one end of a lever 63. The lever is suitably fulcrumed intermediate its ends in a stationary bracket 64. The end of the lever 63 opposite 62 carries a laterally extending roller 65. The roller 65 is disposed in and adapted to cooperate with a circular face cam surface 66 formed in a cam member 67. The cam member is secured on a cam shaft 68, the axis of which is eccentric with respect to the cam surface 66. By means not shown the cam shaft is adapted to rotate one revolution for every indexing movement of the turrets 1 and 2. Thus, each time a tube socket on the turret 1 and an exhaust head on the turret 2 are moved or indexed into the transfer stations thereof, the cam surface 66 will be effective for rocking the lever 63 to reciprocate the rack bar 51, thereby to oscillate the shaft 44 through the pinion 50. Oscillation of the shaft 44 will in turn have the effect of actuating the bracket 37 from the upright position of Fig. 2 to its inverted position of Fig. 5 and then returning it to its upright position.

Now, as seen in Figs. 1–3, 5 and 6, the movable bracket 37 carries means for gripping the tubulation of a tube in a socket 3 on the turret 1 at the transfer station for the purpose of removing it and transferring it to an exhaust head 10 at the transfer station on the outer turret 2. For the purpose of mounting the gripping means the bracket 37 is formed with a laterally extending portion 70. Pivotally mounted on the extension 70 is a pair of levers 71. The levers 71 include portions extending toward the first turret 1 and are biased together by an interconnecting coil spring 72. On the extremities of the levers 71 is provided a pair of jaw members 73 which are adapted for cooperating when closed to grip the tubulation 9 of a tube position at the transfer station of the first turret 1. The levers 71 are normally biased by the spring 72 to the closed or tubulation gripping positions thereof shown in solid lines in Fig. 1. However, in order to provide for moving the device into tubulation gripping position and to release a tube after it has been satisfactorily transferred to an exhaust head on the outer turret it is necessary to provide means for opening the jaws 73 against the bias of the spring 72. In order to accomplish this we have formed the extremities of the levers 71 opposite the jaws 73 with inclined cam surfaces designated 74. Provided for cooperating with the cam surfaces 74 is a pair of rollers 75. The rollers 75 are suitably mounted in spaced relation on a vertical member 76 secured to a horizontal plate 77 which in turn is suitably secured to a plunger 78 of an air cylinder 79 secured by means of a bracket 80 to the laterally extending portion 70 of the bracket 37. The plate 77 is adapted for guided reciprocation by being slidably fitted on a stud 81 secured in the bracket 80. A coil spring 82 on the plunger 78 and another coil spring 83 on the stud 82 are adapted for biasing the plate 77 away from the cylinder 79 thereby to bias the rollers 75 into engagement with the cam surfaces 74 on the levers 71. The spring 72 interconnecting the lever 71, however, is stronger than the combined effects of the springs 82 and 83 and consequently normally the levers 71 are closed or in the tubulation gripping positions. In order to separate the levers 71 thereby to open the jaws 73 it is necessary to overcome the tension of the spring 72. This is accomplished by admitting a blast of compressed air into the cylinder 79 sufficient for actuating the plunger 78 to cause the rollers 75 to cooperate with the cam surfaces 74 and thereby separate the levers 71 in the manner shown in dot and dash lines in Fig. 1. The cylinder 79 is adapted for having the compressed air admitted thereinto through a tube 84 connected to a source of compressed air (not shown). Control of the actuation of the plunger 78, and therefore control of the gripping means, may be determined by the operation of solenoid means or the like adapted for controlling the air flow into the cylinder 79. This controlling means may in turn be controlled by a microswitch 85 or the like shown in Fig. 2. The microswitch 85 may be mounted on a stationary portion 86 of the machine frame and may be adapted for cooperating with a peripheral cam portion 87 formed on the cam member 67.

The microswitch 85 and the peripheral cam portion 87 are adapted for cooperating to admit compressed air into the cylinder 79 only following insertion of an envelope tubulation in the compression head 10 of an exhaust head 11 at the transfer station of the turret 2 and until the gripping means is returned for transferring another tube in a socket 3 subsequently positioned at the transfer station of the turret 1. Thereafter the air cylinder 79 is ineffective for spreading the levers 71 and the spring 72 is effective for causing the jaws 73 to grip the tubulation 9 of the tube at the transfer station. Subsequently, the cam surface 63 in cooperation with the roller 65 on the lever 63 is effective for reciprocating the connecting rod 61 thereby to reciprocate the rack bar 51 for oscillating the shaft 44 through the pinion 50 to actuate the bracket 37 through the slotted link 43 and the roller 41 carried on the bracket 37. In this manner the bracket 37 carrying the levers 71 with the jaws 73 thereof securely gripping the tubulation 9 of a tube in a socket 3 is caused to move first vertically upward for removing the tube from the socket 3 without bending its leads 5, then arcuately for inverting the tube and then vertically downward for inserting the tubulation 9 into the compression head 11 of the exhaust head 10 at the transfer station of the turret 2. Following insertion of the tubulation in this manner the cam surface 87 in cooperation with the microswitch 85 is effective for permitting actuation of the plunger 78 for spreading the levers 71 thereby to release the jaws 73 from the tubulation, to permit subsequent return of the bracket 37 and to permit gripping of the tubulation of a tube in a socket 3 subsequently positioned at the transfer station of the turret 1.

It will be seen that by predeterminedly positioning the sockets 3 of the turret 1 it is possible to insure a predetermined orientation of the tube pins 5 when a tube is transferred form a socket on the turret 1 to an exhaust head at the transfer station of the turret 2, which predetermined orientation is requisite to the satisfactory cooperation of the filament leads of the tube and the contacts 20 in the manners shown in Figs. 9 and 10.

Thus it will be seen that we have provided a completely automatic arrangement for transferring tubes from tube sockets at one station of a machine to exhaust heads at another station and for insuring insertion of the tubes in the exhaust heads with a predetermined orientation of the tube leads in order thereby to afford suitable cooperation between certain of the tube leads and other equipment utilized in the processing of the tubes.

While we have shown and described a specific embodiment of our invention we do not desire our invention to be limited to the particular form shown and described, and we intend by the appended claims to cover all modifications within the spirit and scope of our invention.

What we claim as new and desire to secure by Letters Patent of the United States is:

1. In electronic tube manufacturing equipment, a plurality of laterally spaced operating stations, gripping means including a pair of jaw members biased together for gripping a tube at one operating station, means for actuating said gripping means vertically upward for removing said tube from said one operating station, said last-mentioned means being further effective for inverting said gripping means and thereby transferring said tube to another of said operating stations, and said gripping means including pneumatically operable means for opening said jaws at said other operating station.

2. In electronic tube manufacturing equipment adapted for operating on tubes having an arrangement of prongs and an exhaust tubulation extending from opposite ends thereof, a tube socket including a plurality of vertically extending receptacles adapted for receiving and making electrical contact with the prongs of a tube and being positioned at one operating station, an exhaust head adapted for receiving the exhaust tubulation of a tube and being positioned at another operating station, means for gripping a tube having the prongs thereof inserted in said receptacles in said tube socket at said one operating station, and means for actuating said gripping means effective for removing said tube prongs vertically from said receptacles, said last-mentioned means being further effective for transferring said tube to said other operating station in an inverted position and inserting the tubulation thereof into said exhaust head.

3. In electronic tube manufacturing equipment adapted for operating on tubes having an arrangement of prongs and an exhaust tubulation extending from opposite ends thereof, a tube socket including a plurality of vertically extending receptacles adapted for receiving and making electrical contact with the prongs of a tube and being positioned at one operating station, an exhaust head adapted for receiving the exhaust tubulation of a tube and being positioned at another operating station, means for gripping a tube having the prongs thereof inserted in said receptacles in said tube socket at said one operating station, and automatic means cyclically effective for operating said gripping means thereby to remove said tube prongs vertically from said receptacles, said last-mentioned means being further effective for inverting said gripping means thereby to transfer said tube to said other operating station and to insert the tubulation thereof into said exhaust head.

4. In electronic tube manufacturing equipment, a pair of concentric turrets, tube holding means carried by each of said turrets and positionable at a common transfer station by rotation of said turrets, means at said transfer station for gripping a tube held by the holding means on one of said turrets, means for actuating said gripping means effective for removing said tube from said holding means on said one turret, said last-mentioned means being further effective for transferring said tube to said holding means on the other of said turrets, and said holding means on said one turret being effective for holding said tube in a predetermined oriented rotative position about its longitudinal axis in said transfer station whereby said tube is predeterminedly rotatively oriented when transferred to said holding means on said other turret.

5. In electronic tube manufacturing equipment, a tube socket adapted for receiving a tube and being positioned at one operating station, an exhaust head adapted for receiving the exhaust tubulation of a tube and being positioned at another operating station, means for gripping a tube inserted in said tube socket at said one operating station, and means for actuating said gripping means effective for removing said tube from said socket, said last-mentioned means being further effective for transferring said tube to said other operating station and inserting the tubulation thereof into said exhaust head thereat, said tube socket including an array of tube lead receptacles arranged in a predetermined orientation whereby the leads of a tube transferred from said socket are predeterminedly oriented when the tubulation of said tube is inserted in said exhaust head at said other operating station.

6. In electronic tube manufacturing equipment, a pair of tube holding means movable along a pair of parallel paths and positionable at a common transfer station, gripping means for gripping a tube held by one of said holding means in one path, means effective for operating said gripping means to remove said tube from said one holding means, said means for operating said gripping means being further effective for inverting said gripping means and thereby transferring said tube to the other of said holding means in the other path, and said one holding means being effective for holding said tube in a predetermined oriented rotative position about its longitudinal axis whereby said tube is predeterminedly oriented rotatively when transferred to said other holding means.

7. In electronic tube manufacturing equipment, a tube socket adapted for receiving a tube and being positioned at one operating station, an exhaust head adapted for receiving the exhaust tubulation of a tube and being positioned at another operating station, means for gripping a tube inserted in said tube socket at said one operating station, and automatic means cyclically effective for operating said gripping means to remove tubes from said socket, said last-mentioned means being further effective for transferring said tubes to said other operating station and inserting the tubulation thereof into said exhaust head thereat, said socket including an array of predeterminedly arranged tube lead receptacles whereby the leads of a tube transferred from said socket are predeterminedly oriented when the tubulation thereof is inserted in said exhaust head at said other operating station.

8. In equipment for manufacturing electric discharge devices including a plurality of leads exending from one end and an exhaust tubulation extending from the opposite end, a plurality of operating positions, a tube socket including a plurality of receptacles adapted for receiving the leads of a device at one of said positions, said receptacles being predeterminedly oriented whereby said device is held in said socket in a predetermined rotative position, an exhaust head adpated for receiving the tubulation of said device at another of said positions, means for gripping said device at said one position, means for actuating said gripping means effective for withdrawing said leads rectilinearly from said receptacles, thereby to avoid bending of said leads, means for inverting said gripping means effective for inverting said device and transferring said device to said other position, and means for actuating said gripping means for inserting said tubulation rectilinearly into said exhaust head, thereby to avoid damage to said tubulation, said predetermined orientation of said socket receptacles being effective for insuring predetermined orientation of said leads when said tubulation is inserted in said exhaust head.

9. An electron tube processing machine including electron tube socket indexing means for indexing a plurality of electron tube receiving sockets seriatim into tube unloading position, vacuum head indexing means for indexing a plurality of vacuum heads for receiving the hollow tubulations on the end of the electron tube glass envelopes seriatim into tube loading position, and a transfer device positioned intermediate the electron tube socket indexing means and the vacuum head indexing means for transferring electron tubes seriatim from one to the other, said transfer device comprising electron tube gripping means operative upon arrival of an electron tube socket at the unloading position to grip an electron tube seated therein and to release the electron tube upon placement at the tube loading position, and cyclically operable means for sequentially moving the gripping means linearly upward a distance sufficient to remove the prongs of the electron tube from the socket, said cyclically operable means also simultaneously inverting and transposing the gripping means to a new position over a vacuum head that has been indexed into tube loading position, said cyclically operable means then being operative to move the gripping means linearly downward a distance sufficient to insert the tubulation into the vacuum head whereupon the gripping means releases the electron tube held thereby, said cyclically operable means then returns the gripping means to the tube unloading position.

References Cited in the file of this patent

UNITED STATES PATENTS

| | | |
|---|---|---|
| 1,094,774 | Berliner | Apr. 28, 1914 |
| 2,069,086 | Donovan et al. | Jan. 26, 1937 |
| 2,123,363 | Joplin | July 12, 1938 |
| 2,392,799 | Scholes et al. | Jan. 8, 1946 |
| 2,661,101 | Mullan et al. | Dec. 1, 1953 |
| 2,692,669 | Slagle | Oct. 26, 1954 |